United States Patent
Nguyen et al.

(10) Patent No.: US 7,577,865 B2
(45) Date of Patent: Aug. 18, 2009

(54) SYSTEM AND METHOD FOR FAILURE RECOVERY IN A SHARED STORAGE SYSTEM

(75) Inventors: Nam V. Nguyen, Round Rock, TX (US); Jacob Cherian, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 463 days.

(21) Appl. No.: 11/404,816

(22) Filed: Apr. 14, 2006

(65) Prior Publication Data
US 2007/0260916 A1 Nov. 8, 2007

(51) Int. Cl.
*G06F 11/00* (2006.01)
(52) U.S. Cl. .............................. 714/4; 709/213; 709/214
(58) Field of Classification Search ........................ None
See application file for complete search history.

(56) References Cited

U.S. PATENT DOCUMENTS 6,606,690 B2 *  8/2003  Padovano ................... 711/148
6,735,676 B1 *  5/2004  Kanda et al. ................ 711/147
7,039,741 B2 *  5/2006  Bakke et al. ................ 710/300
7,240,234 B2 *  7/2007  Morita et al. .................. 714/4
2003/0074417 A1 *  4/2003  Kasako et al. ............... 709/217
2007/0038749 A1 *  2/2007  Noya et al. .................. 709/226

* cited by examiner

*Primary Examiner*—Christopher S McCarthy
(74) *Attorney, Agent, or Firm*—Baker Botts L.L.P.

(57) ABSTRACT

A system and method is disclosed for failure recovery and communications in a shared storage system. The shared storage system includes at least two host nodes, each of which includes two ports. Each of the ports of each of the nodes is coupled to input ports of a storage enclosure. The input ports of the storage enclosures are in turn coupled to one another to form communications links between each of the host nodes. When the communications links between the host nodes fail, the host nodes are able to pass configuration information to each other by saving configuration information to a central location in a shared storage, such as a dedicated location in one of the storage drives of the storage enclosure that is directly coupled to both host nodes. The host nodes are able to force their peer nodes to read configuration changes before accessing possibly corrupted data from a previous configuration.

19 Claims, 4 Drawing Sheets

SYSTEM AND METHOD FOR FAILURE RECOVERY IN A SHARED STORAGE SYSTEM

TECHNICAL FIELD

The present disclosure relates generally to computer systems and information handling systems, and, more particularly, to a system and method for failure recovery in a shared disk storage system.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

Computer systems, including servers and workstations, are often grouped in clusters to perform specific tasks. A server cluster is a group of independent servers that is managed as a single system and is characterized by high availability, manageability, and scalability, as compared with groupings of unmanaged servers. At a minimum, a server cluster includes two servers, which are sometimes referred to as nodes. In some configurations, the nodes or servers of the cluster are coupled to shared storage. The storage is known as shared storage because it is accessible by each of the nodes of the cluster. In a server cluster having two nodes, both of the nodes would be able to access the shared storage resources.

The nodes of the server cluster communicate with one another to manage the operation of the cluster server and the shared storage resources. In some configurations, the nodes of the server cluster communicate with each other through a communications link that passes through the shared storage resources. As an example, the shared storage resources may comprise multiple disk enclosures housing, each of which may house one or more storage drives. The nodes of the server cluster may communicate with one another by transmitting communications via the communications links that interconnect the multiple disk enclosures of the shared storage resources.

If communication links between disk enclosures are broken or otherwise inoperative, the nodes of the server cluster may be prevented from communicating with one another. In this circumstance, even though the nodes of the server cluster cannot communicate with one another, the nodes may nevertheless be able to access at least a portion of the shared storage resources. Because the nodes of the server cluster cannot communicate with one another, the nodes cannot collectively manage the logical ownership of shared storage resources or changes to the configuration of the shared storage resources. As such, one node can make changes to the logical ownership of shared storage resources or changes to the configuration of the shared storage resources without notifying or receiving the approval of the other node. In this state, a split brain condition can occur in which there is a risk of corrupting the data, the disk configuration, or both.

SUMMARY

In accordance with the present disclosure, a system and method is disclosed for failure recovery and communications in a shared storage system. The shared storage system includes at least two host nodes, each of which includes two ports. Each of the ports of each of the nodes is coupled to input ports of a storage enclosure. The input ports of the storage enclosures are in turn coupled to one another to form a communications links between each of the host nodes. When the communications links between the host nodes fail, the host nodes are able to pass configuration information to each other by saving configuration information to a central location in a shared storage, such as a dedicated location in one of the storage drives of the storage enclosure that is directly coupled to both host nodes. The host nodes are able to force their peer nodes to read configuration changes before accessing possibly corrupted data from a previous configuration.

The system and method disclosed herein is technically advantageous because it provides a technique for communication between the nodes of a system despite the loss of the conventional communications link between the nodes. Thus, despite the loss of an established communications link between the nodes, the nodes can nevertheless pass configuration information between themselves by use of a reservation system and a central location in shared storage. Thus, in the event of a loss of a communications link between the nodes, the risk of storage corruption is diminished, as the nodes can communication configuration information to one another.

Another technical advantage of the system and method disclosed herein is that the system and method disclosed herein does not otherwise interfere with the operation of the network and prevents each node from taking action that may result in the corruption of the storage configuration of the network. A reservation system is put in place to alert each node to the existence of configuration information saved to shared storage. Because of the reservation system, a node cannot take action until recognizing the existence of the configuration saved to shared storage. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
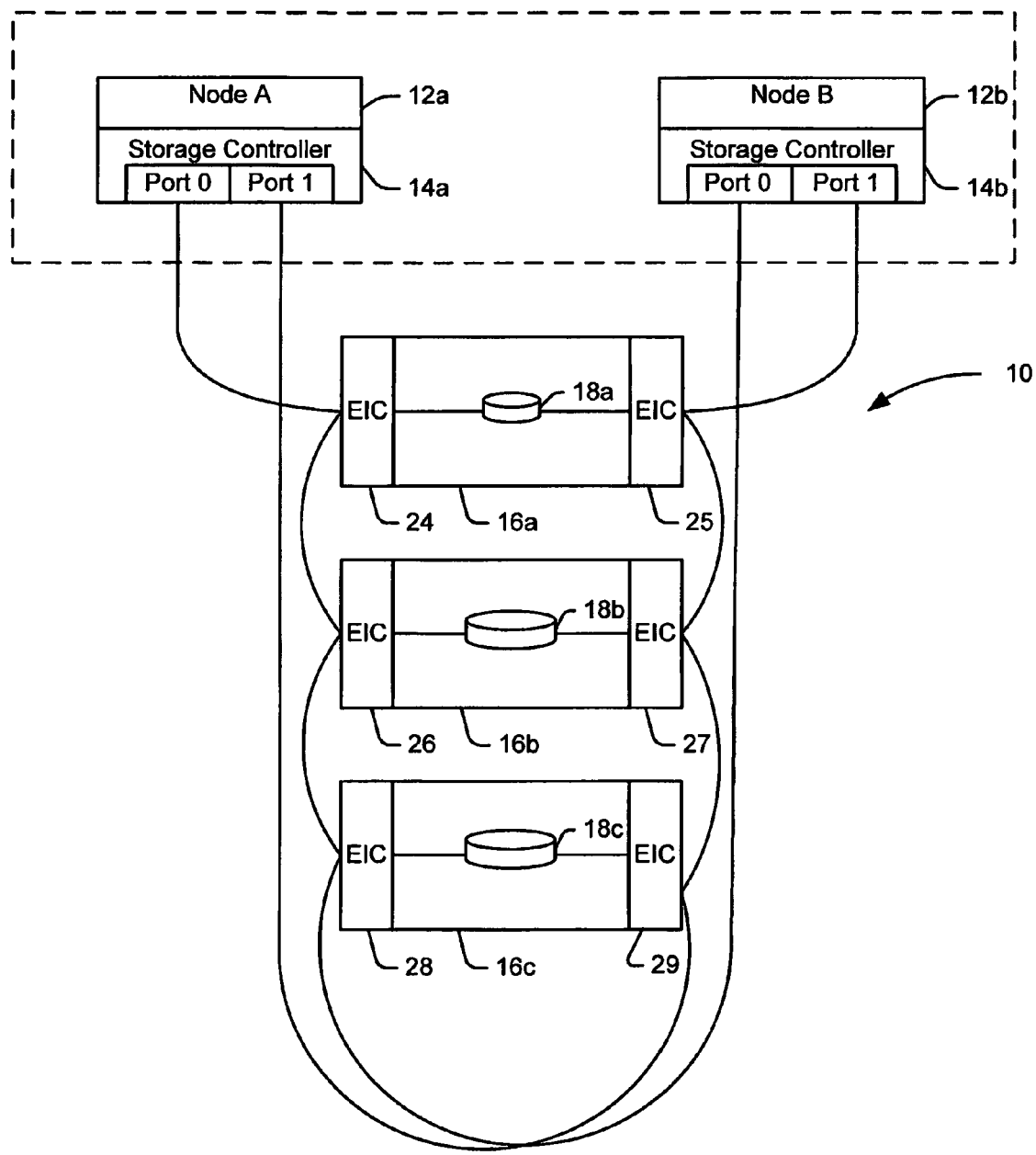
FIG. 1 is a diagram of a network.

Shown in FIG. 1 is a diagram of a network, which is indicated generally at 10. Network 10 includes a server cluster 12 comprised of servers or nodes 12a and 12b. Node 12a is identified in FIG. 1 as Node A, and Node 12b is identified in FIG. 1 as Node B. Each node includes a storage controller 14, which may is configured in this example as a Serial-Attached SCSI (SAS) RAID controller. Each SAS RAID controller 14 includes two ports, which are identified in each node as Port 0 and Port 1. Each port of each node is coupled to an enclosure interface controller (EIC) of one of the disk enclosures 16 according to a SAS topology. Each disk enclosure 16 includes two enclosure interface controllers. Coupled between the enclosure interface controllers of each disk enclosure are the disk or disks 18 of the disk enclosure.

In the example of FIG. 1, the storage resources of the network comprise three disk enclosures 16. Port 0 of node 12a is coupled to enclosure interface controller 24 of disk enclosure 16a. Port 1 of node 12a is coupled to enclosure interface controller 29 of disk enclosure 16c. Port 0 of node 12b is coupled to enclosure interface controller 28 of disk enclosure 16c, and port 1 of node 12b is coupled to enclosure interface controller 25 of disk enclosure 16a. Each of the enclosure interface controllers is coupled to at least one other enclosure interface controller. In this example, enclosure interface controller 24 is coupled to enclosure interface controller 26 of disk enclosure 16b, and enclosure interface controller 26 is coupled to enclosure interface controller 28. Enclosure interface controller 29 is coupled to enclosure interface controller 27 of disk enclosure 16b, which is also coupled to enclosure interface controller 25. In normal operation, node 12a can communicate with node 12b through the path created by enclosure interface controller 24, enclosure interface controller 26, and enclosure interface controller 28; or through the path created by enclosure interface controller 29, enclosure interface controller 27, and enclosure interface controller 25.

As an example, if the links between enclosure interface controller 27 and enclosure interface controller 25 fails, and if the link between enclosure interface controller 26 and enclosure interface controller 24 also fails, node 12a cannot communicate with node 12b through the enclosure interface controllers. Also, if disk enclosure 16a fails, node 12a would not be able to communicate with node 12b through the enclosure interface controllers. In this circumstance, there is not a path through the enclosure interface controller that would allow for the passage of a communication between the two nodes of the server cluster. Although the two nodes cannot communicate with one another, the nodes can nevertheless access disk enclosure 16b and disk enclosure 16c, thereby raising the risk that the data or configuration of these disks could be corrupted as a result of the inability of the nodes to communicate with one another for the purpose of managing the shared storage resources.

Figure 2:
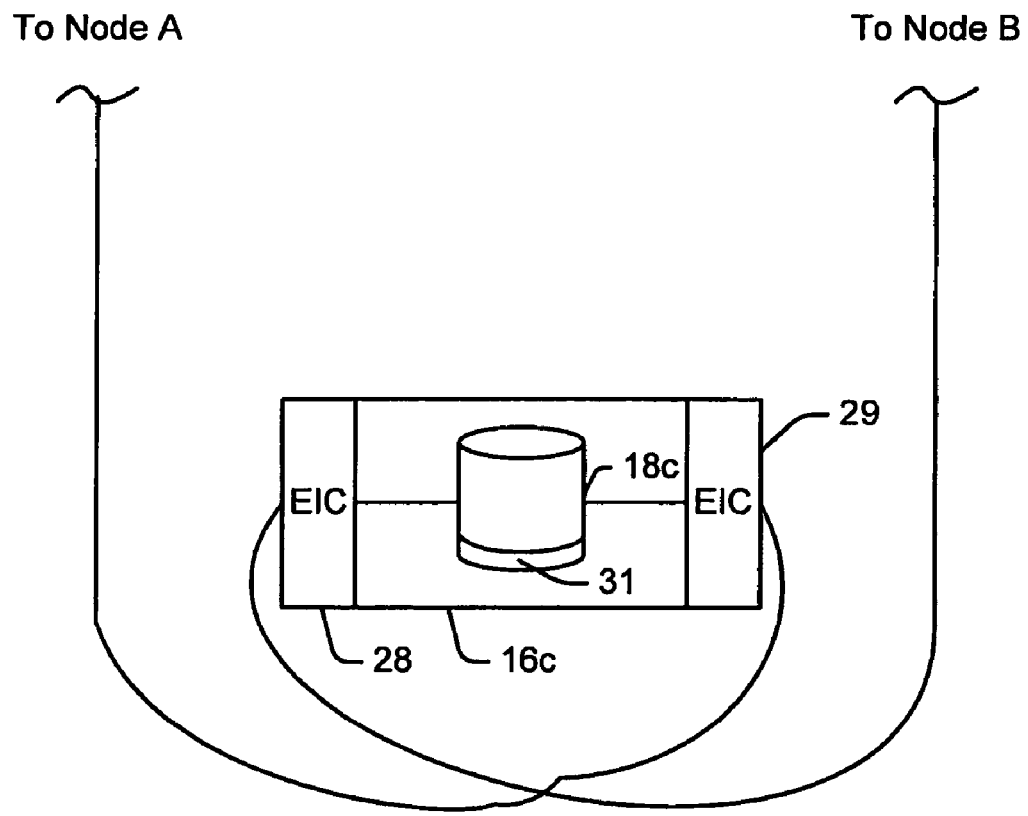
FIG. 2 is a diagram of a disk enclosure of the network of FIG. 1.

Despite the broken links between adjacent disk enclosures, the storage controllers can communicate with one another through a shared drive that is accessible to both storage controllers. Thus, so long as there is one shared drive that is accessible to both, the storage controllers are able to communicating by passing communications as messages saved to a reserved space on a drive of the mutually accessible disk enclosure. Shown in FIG. 2 is a more detailed diagram of disk enclosure 16c. Despite the inability of the storage controllers of node 12a and node 12b to communicate with one another through enclosure interface controllers, the storage controllers can each access the storage resources of disk enclosure 16c. Disk 18c includes a reserved storage space 31 for storing communications between the storage controllers of Node A and Node B. Storage space 31, which may include the metadata of the disk, acts as a mailbox or central repository for communications between storage controller 14a and storage controller 14b. Storage space 31 may be subdivided into several subspaces, each of which is associated with one of the nodes of the network.

Figure 3:
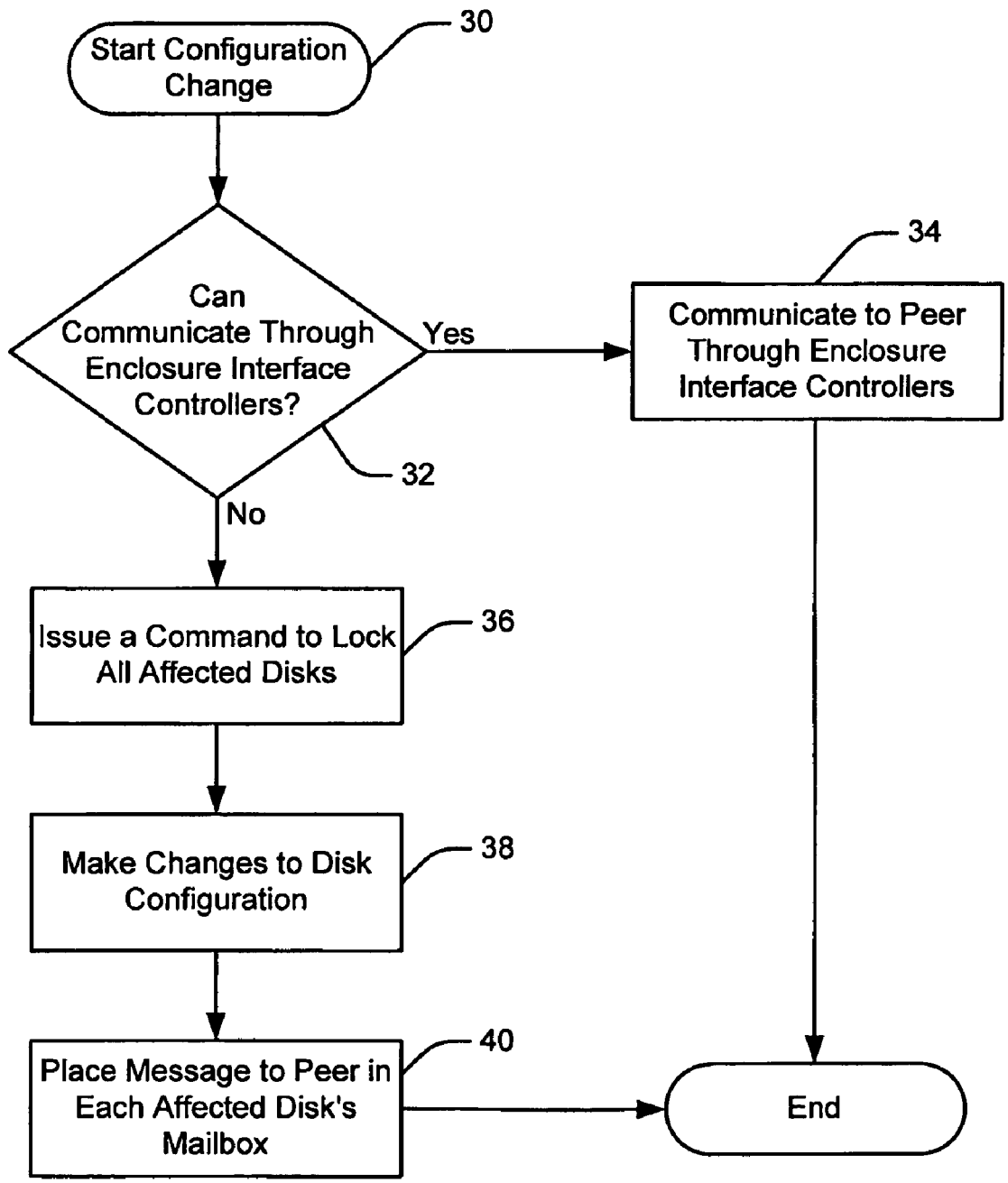
FIG. 3 is a flow diagram of a method for initiating a configuration change following a communication failure between adjacent enclosure interface controllers.

When a storage controller makes a change to the configuration of the shared storage resources of the network, the storage controller places a communication in the shared repository 31. The placement of the communication in the mailbox in turn forces the other storage controller to read the communication before issuing any access commands (read or write commands). Shown in FIG. 3 is a flow diagram of a series of method steps for initiating a configuration change following a communication failure between adjacent enclosure interface controllers. The steps of FIG. 3 are performed from the reference point of the node initiating the configuration change. At step 30, a configuration change is initiated by the node. At step 32, the initiating node determines whether it can communicate with the other node through the communications links established through the enclosure interface controllers. If the nodes can communicate, as normal, through the enclosure interface controllers, then the nodes communicate with one another through the SAS links and the enclosure interface for the purpose of completing the configuration change.

If it is determined at step 32 that the nodes cannot communicate with one another through the enclosure interface controllers, the initiating node issues a command, such as a Persistent Reserve command, that causes the other nodes to enter a state in which the other nodes are prevented from reading from or writing to the disks that are the subject of the configuration change. The initiating node next makes the configuration change at step 38 and then places a communication in storage mailbox 31 of each affected peer node.

Figure 4:
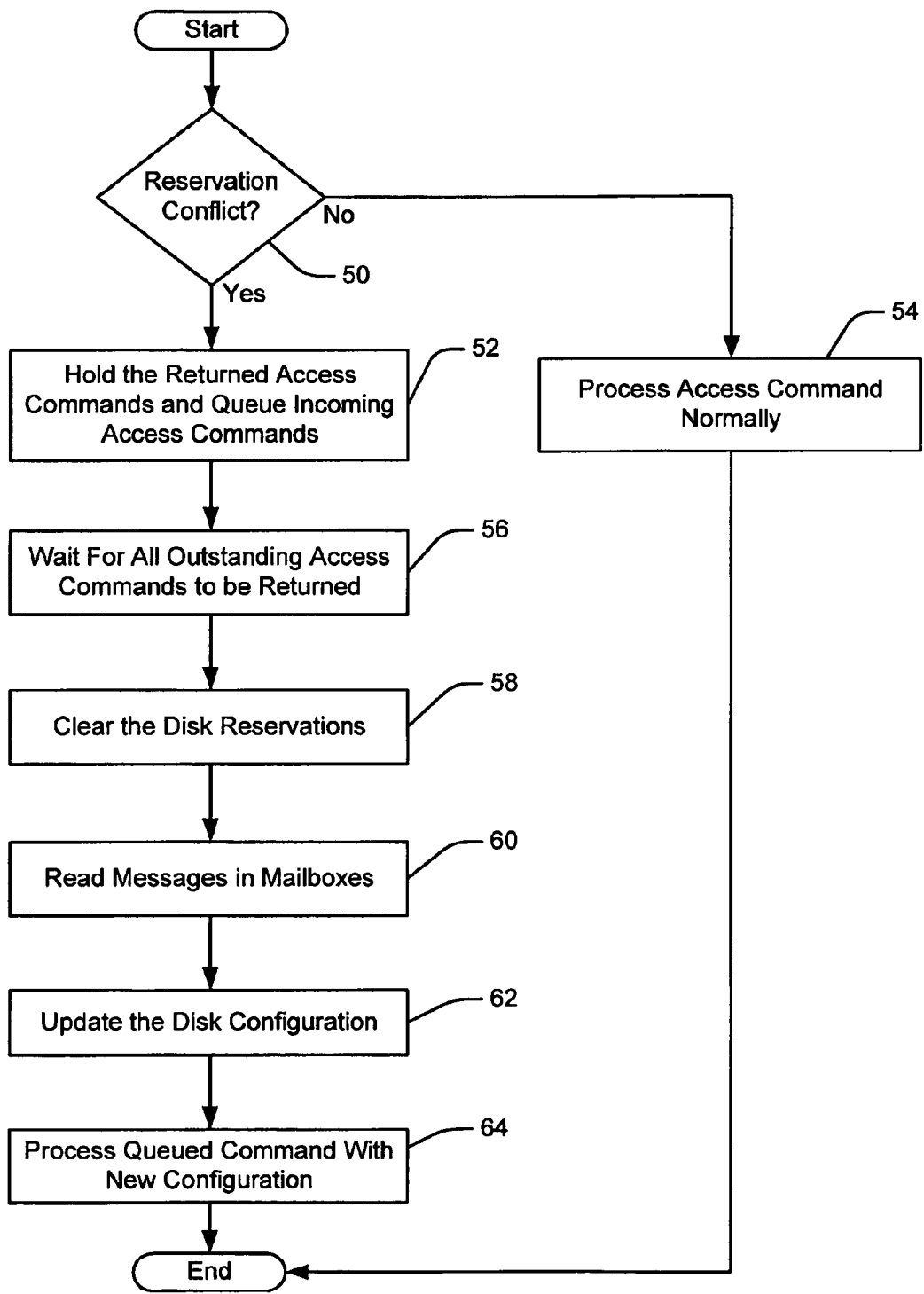
FIG. 4 is a flow diagram depicting steps performed by a node when the node determines that a hold or reservation command has been issued with respect to the shared storage resources of the network.

Shown in FIG. 4 is a flow diagram that depicts the method steps performed by a node when the node determines that a hold or reservation command has been issued with respect to the shared storage resources of the network. At step 50, a node attempting to access the shared storage resources of the network determines if there is a reservation conflict. A reservation conflict occurs if another node has placed a reservation or hold on the storage resources of the network, thereby preventing other nodes from writing to the shared storage resources. If it is determined at step 50 that a reservation conflict does not exist, the storage controller issuing the access command proceeds normally at step 54. If it is determined that a reservation conflict does exist, the issued access command is returned to the node. At step 52, the returned access command and any other incoming access commands are queued at the node. At step 56, the node waits for any other unreturned access commands to be returned to the node. At step 58, the node clears the reservation or hold state. At step 60, the node reads the communication that was stored by the issuing node in the mailbox 31 that is associated with the node that is presently attempting to complete the access command. The node at step 62 next modifies its configuration to comply with or accommodate the configuration changes issued by the initiating node. Thus, before the node can proceed, it must first recognize the configuration changes saved to the repository by the initiating node. At step 64, all access commands queued by the node are processed normally, and the steps of the flow diagram conclude.

The system described herein provides a repository within a shared storage disk of the network for passing configuration communications between the nodes of the network. Thus, the nodes of the network may communicate configuration information to one another despite the failure of the conventional communication links of the network. Although the system and method disclosed herein has been described with reference to network having an SAS architecture, it should be recognized that the system and method may be employed in other networks in which inoperative links may prevent the nodes of the network from communicating with one another. It should also be understood that the system and method disclosed herein is not limited in its application to networks having only two nodes. Rather, the system and method disclosed herein may be used in network that includes multiple storage controllers. In the event of a failure in such a network, the nodes of the network would communicate with one another through a node that is accessible to each of the nodes of the network. Although the present disclosure has been described in detail, it should be understood that various changes, substitutions, and alterations can be made hereto without departing from the spirit and the scope of the invention as defined by the appended claims.

What is claimed is:

1. A network, comprising:
   a first host node;
   a second host node;
   a first storage enclosure coupled to the first host node and the second host node, wherein the storage enclosure includes a first interface controller coupled to the first host node and a second interface controller coupled to the second host node, and wherein the first host node is able to communicate with the second host node through either the first interface controller or the second interface controller of the storage enclosure;
   a shared storage space within the first storage enclosure, wherein the shared storage space is accessible to the first interface controller and the second interface controller of the first storage enclosure;
   wherein, in the event of a failure in the communications link, the first host node is able to pass configuration information to the second host node by storing the configuration information in the shared storage space of the first storage enclosure; and
   wherein the first host node is operable, after saving configuration information to the shared storage, to cause the second host node to enter a state in which the second host node cannot read or write to the shared storage without first recognizing the configuration information saved by the first host node to the shared storage.

2. The network of claim 1, further comprising:
   a second storage enclosure, wherein the second storage enclosure includes a first interface controller coupled to the first interface controller of the first storage enclosure and a second interface controller coupled to the second interface controller of the first storage enclosure;
   wherein the communications link passes through the first interface controller and the second interface controller of the of the second storage enclosure;
   wherein the second storage enclosure includes a shared storage, wherein the shared storage is accessible to the first interface controller and the second interface controller of the second storage enclosure;
   wherein, in the event of a failure in the communications link, the first host node is able to pass configuration information to the second host node by storing the configuration information in the shared storage of at least one of the first storage enclosure or the second storage enclosure.

3. The network of claim 1, wherein the nodes manage the shared storage of the first storage enclosure according to the Serial-Attached SCSI protocol.

4. The network of claim 1, wherein the shared storage within the first storage enclosure comprises a disk.

5. The network of claim 4, wherein the data on the disk is configured according to a redundant storage methodology.

6. The network of claim 5, wherein the data on the disk is configured according to a RAID storage methodology.

7. The network of claim 6, wherein the configuration information is saved to a dedicated location within the storage enclosure.

8. The network of claim 7, wherein the disk includes dedicated storage associated with the first node and dedicated storage associated with the second node.

9. A method for modifying the configuration of network, wherein the network includes a first host node, a second host node, and a storage enclosure coupled to the first host node and the second host node, wherein the storage enclosure includes a first interface controller coupled to the first host node and a second interface controller coupled to the second host node, comprising:
   detecting at the first host node a failure in an established communications link between the first host node and the second host node, wherein the established communications link is coupled through the first interface controller and the second interface controller of the storage enclosure;
   identifying shared storage within the storage enclosure that is accessible to the first interface controller and the second interface controller of the storage enclosure;
   by the first host node, saving configuration information to the shared storage; and
   by the second host node, reading configuration information saved by the first host node to shared storage.

10. The method for modifying the configuration of network of claim 9, wherein the shared storage comprises a storage array.

11. The method for modifying the configuration of network of claim 10, wherein the shared storage comprises a dedicated location on a disk of the storage array.

12. The method for modifying the configuration of network of claim 10, wherein the storage array is configured according to a redundant storage methodology.

13. The method for modifying the configuration of network of claim 12, wherein the storage array is configured according to a RAID storage methodology.

14. The method for modifying the configuration of network of claim 10, wherein the storage array includes a first location associated with the first node and a second location associated with the second node.

15. The method for modifying the configuration of network of claim 9, further comprising the step of issuing a reservation command to cause the second host node to recognize the configuration information saved to the first host before reading from or writing to the shared storage.

16. A method for modifying and recognizing a modification to the configuration of a network, wherein the network includes a first host node, a second host node, and a storage enclosure coupled to the first host node and the second host node, wherein the storage enclosure includes a first interface controller coupled to the first host node and a second interface controller coupled to the second host node, comprising:

detecting at the first host node a failure in an established communications link between the first host node and the second host node, wherein the established communications link is coupled through the first interface controller and the second interface controller of the storage enclosure;

identifying shared storage within the storage enclosure that is accessible to the first interface controller and the second interface controller of the storage enclosure;

by the first host node, saving configuration information to the shared storage;

by the first host node, issuing a command to prevent the second host node from writing to the shared host node without first recognizing the configuration information saved to the shared storage;

by the second host node, reading configuration information saved by the first host node to shared storage; and by the second host node, recognizing the configuration information saved to the first host node to the shared storage.

17. The method for modifying and recognizing a modification to the configuration of a network of claim 16, wherein the shared storage comprises a storage array of multiple disks.

18. The method for modifying and recognizing a modification to the configuration of a network of claim 17, wherein the configuration information is saved to a dedicated location on a disk in the storage array.

19. The method for modifying and recognizing a modification to the configuration of a network of claim 17, wherein storage array is configured according to a RAID storage methodology.

* * * * *

UNITED STATES PATENT AND TRADEMARK OFFICE
CERTIFICATE OF CORRECTION

PATENT NO. : 7,577,865 B2  Page 1 of 1
APPLICATION NO. : 11/404816
DATED : August 18, 2009
INVENTOR(S) : Nguyen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 589 days.

Signed and Sealed this

Seventh Day of September, 2010

David J. Kappos
*Director of the United States Patent and Trademark Office*